May 23, 1950 S. N. GOLDMAN 2,508,670
BABY SEAT FOR STORE CARTS
Filed May 5, 1949 2 Sheets-Sheet 1
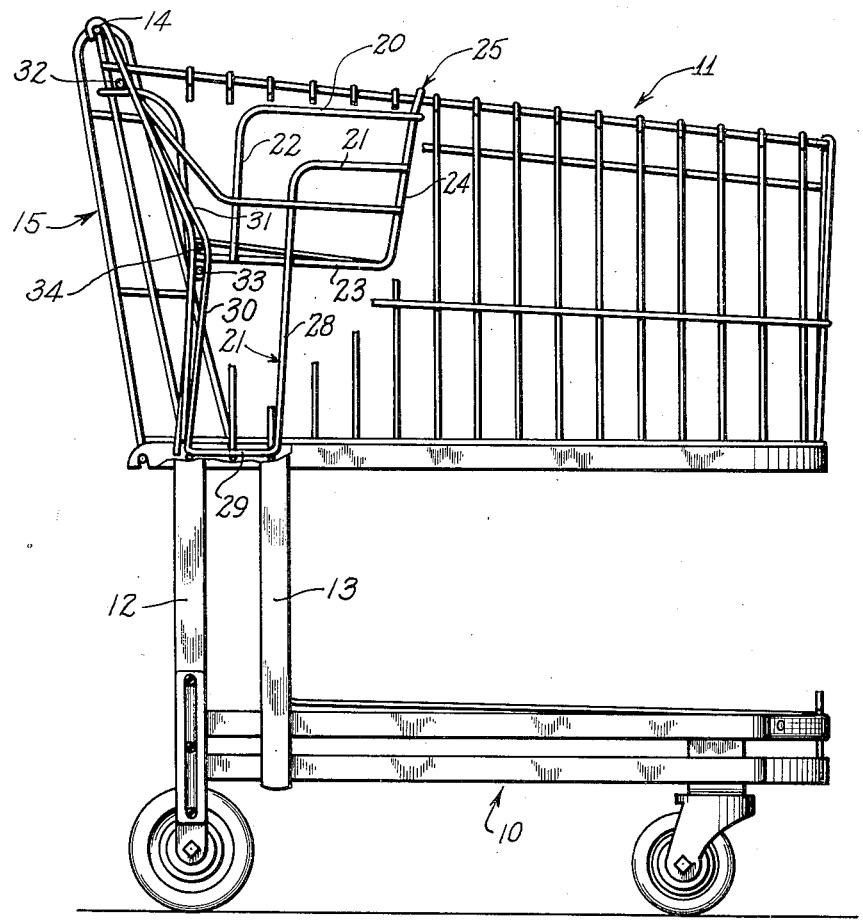
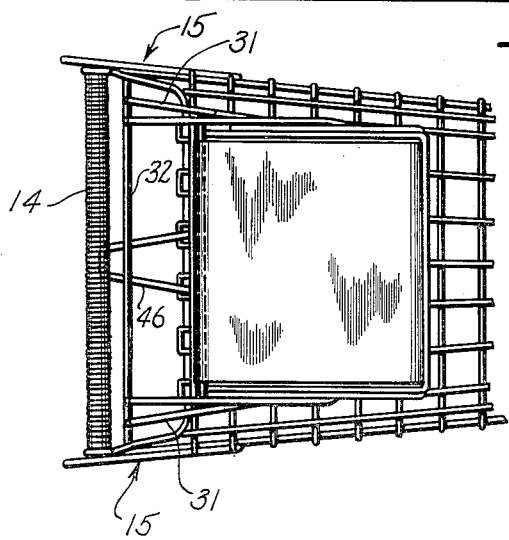
Fig. 1
Fig. 2
INVENTOR.
Sylvan N. Goldman
BY Christian L. Nielsen
ATTORNEY May 23, 1950  S. N. GOLDMAN  2,508,670
BABY SEAT FOR STORE CARTS
Filed May 5, 1949  2 Sheets-Sheet 2
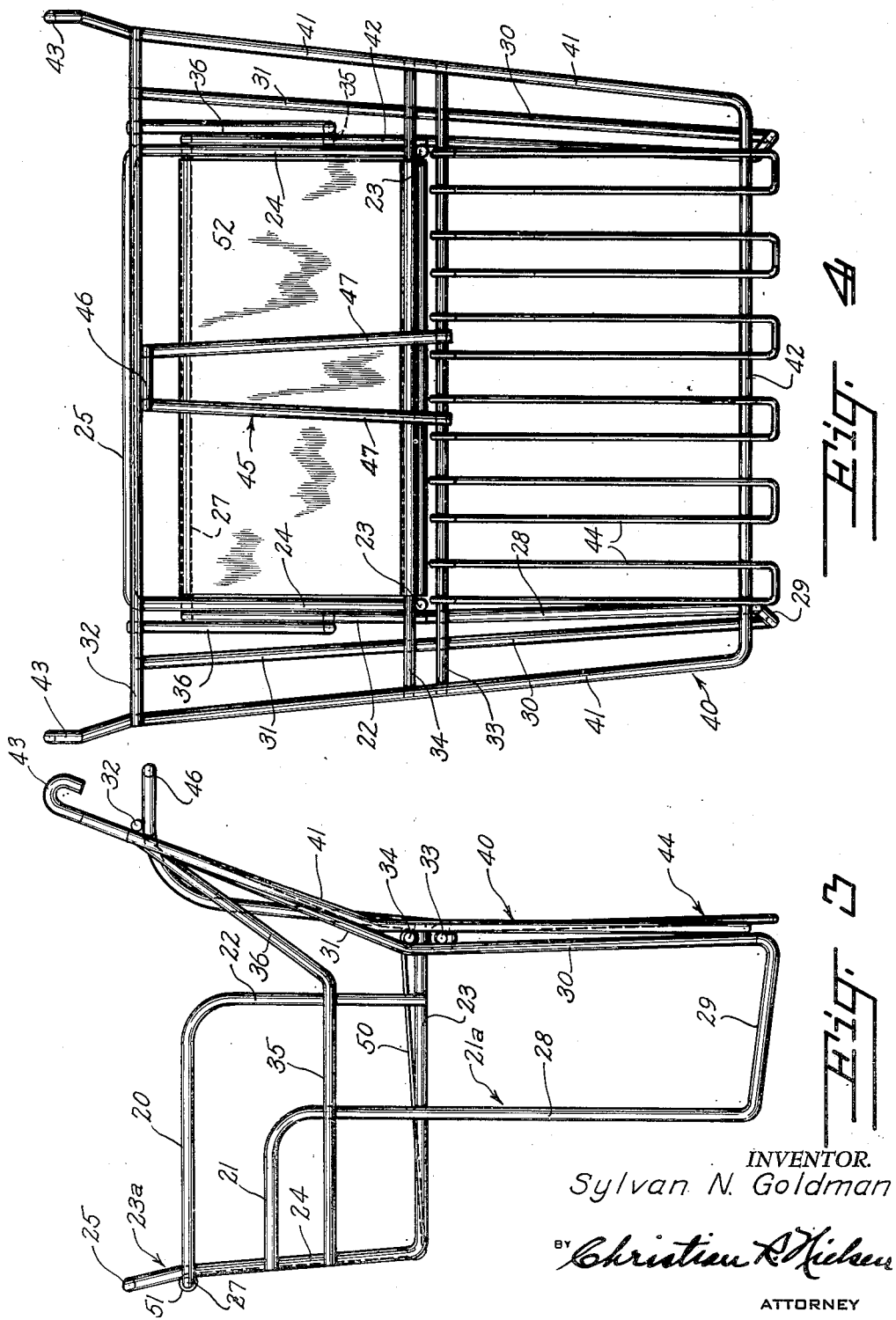
INVENTOR.
Sylvan N. Goldman
BY Christian R Nielsen
ATTORNEY Patented May 23, 1950

2,508,670

UNITED STATES PATENT OFFICE 2,508,670

BABY SEAT FOR STORE CARTS

Sylvan N. Goldman, Oklahoma City, Okla.

Application May 5, 1949, Serial No. 91,483

8 Claims. (Cl. 280—47)

This invention relates to baby seats which may be applied readily to wheeled carriers employed in grocery stores.

An object of the invention is the provision of a baby seat which may be applied easily or removed readily from a wheeled carrier for grocery stores, when desired, the baby seat being manufactured from wires or thin metal rods of sufficient rigidity to support a child, the framework of the body of the seat being supported by rods extending upwardly with hooks at the free ends thereof for engagement over the handle bar of the carrier, the rods being extensions of the legs of a pair of U-shaped members which aid in supporting the seat on the bottom of basket of the carrier.

Another object of the invention is the provision of a removable baby seat for wheeled carriers used in grocery stores, said seat being in the form of a light metal frame having depending legs adapted to rest on the bottom of the usual wire basket of the carrier with a screen for closing the open rear end of said basket, rods projecting upwardly in integral formation from the legs and equipped with hooks for supporting the seat from the handle bar of the carrier.

A further object of the invention is the provision of a removable baby seat for wheeled carrier in which a metal frame-work is supported by the handle of the carrier and by the bottom of the usual carrier basket, said frame work including a closure for the rear open end of the basket and an upstanding U-shaped member at the front of the seat for separating the legs of the child and for preventing slippage of the child from the seat.

The invention is best understood from a consideration of the following detailed description in connection with the accompanying drawings forming part of the specification, nevertheless, it must be borne in mind that the invention is not confined to the disclosure but is susceptible of such changes and modifications as shall define no material departure from the salient features of the invention as expressed in the appended claims.

In the drawings:

Figure 1 is a side view in elevation of a carrier employed in stores with parts broken away to disclose a baby seat in operative relation in a wire basket of the carrier.

Figure 2 is a fragmentary plan of the carrier with the seat in position.

Figure 3 is a side view in elevation of the seat attached from the carrier.

Figure 4 is a front view in elevation of the detached seat.

Referring more particularly to the drawings, 10 designates a wheeled truck of a carrier used in grocery stores by the vendee for the transportation of goods selected from the shelves of the store. This type of carrier has a built in basket 11 which is elevated above the truck by uprights 12 and 13 at the rear end thereof to provide an open space between the front ends of the basket and the truck. The rear upper edge of the basket 11 has an open end which is closed normally by a swingable wire frame adjacent to a handle bar 14 employed for propelling the carrier. The handle is supported by inverted U-shaped members 15 formed of a sufficiently rigid piece of wire connected to a base portion 16 of the basket. The construction of the carriers is such that they may be nested readily into each other.

The foundation of the baby seat is a body formed of a metal frame work which includes a pair of parallel wires or thin rods 20 and 21 at each side of the body (Figure 3) to provide arm rests or hand grips. Each wire 20 has a depending right angular extension 22 welded at the lower end thereof to a horizontal wire 23 which has an upright extension 24 terminating in a bight portion 25 of which the elements 24 and 26 form the legs of a U-shaped member 23a. The elements 20, 21, and 22, as are the elements 23 and 24 are located at each side of the body. The wires 20 form the legs of a U-shaped member whose bight portion 27 is welded to the legs 24 of the vertically disposed U-shaped member. The free lower end of the extensions 22 are welded to the horizontal wires 23.

The wire 21, forming part of a U-shaped member 21a at each side of the body, is continued downwardly as a leg 28, then outwardly at 29 as the bight portion and upwardly as at 30 to provide the other leg of the U-shaped member. Upper angular portions 31 of the legs 30 are welded to a cross rod 32, while the intermediate portions of said legs at each side of the seat are welded to parallel cross rods 33 and 34. Horizontal brace rods 35 are welded to the legs 24 and to the members 28. An angular extension 36 of each rod 35 has the free end thereof welded to the cross rod 32.

A U-shaped member 40 has bent legs 41 rising from the ends of a bight portion 42 and welded to the ends of the cross rods 32, 33 and 34. The free ends of the legs terminate in hooks 43 which engage over the ends of the handle bar 14 (Figure 2) of the carrier for supporting the front portion of the body of the seat.

U-shaped members 44 have the free ends of the legs bent around the cross rod 33. The lower ends of the U-shaped members 44 are spaced from each other in a uniform manner and are welded to the bight portion 42 of the U-shaped member 40. The construction just described provides a screen or closure for the usual open rear end of the basket 11.

A device for separating the legs of a child and for preventing the child from slipping from the seat is in the form of a U-shaped member 45 having a bight portion 46 projecting forwardly of the bar 32 to which the horizontal portions of the legs are welded. The vertical portions 47 of the legs diverge and have the free ends thereof welded to the cross rod 33.

The seat per se or supporting element for the child is in the form of a thin sheet 50 of steel which has one end coiled around the bight portion 27 of the horizontal legs 20, as shown at 51. The sheet is carried downwardly between the members 25 to provide a back rest 52 and is then directed forwardly with the free end being coiled about the cross rod 34.

It will be noted from Figures 3 and 4 that the vertical extensions 30 are offset slightly from the vertical plane passing through the members 29 since the vertical extensions are inclined at an angle to the vertical. The bight portions 29 rest upon the bottom of the basket 11 and cooperate with the hooks 43 to support the seat therein. The slight inclination of the bight portions 29 permits full engagement of said bight portion with the bottom of said basket because the body as shown in Figure 1 is inclined to the vertical when in place.

The seat is readily removed from the basket by lifting the same, whence the hooks 43 will be moved out of engagement with the handle bar 14. On the other hand, the seat will be securely retained in place in the basket by the weight of the child since the pull on the seat is along a diagonal line. This pull maintains the hooks 43 firmly in place as long as a child is in the seat.

It will be noted from Figure 3 that the main body of the seat is constructed from a single and inverted U-shaped member 23a composed of the bight portion 25 and the angularly shaped legs 24—23. A pair of U-shaped members 21a having the bight portions 29 and legs 28 and 30 forms the supports for the body in connection with the hooks 43. The cross bar 34 together with the arm rests 20 and the sheet of metal 50 complete the seat. The inverted U-shaped member 23a has its legs 24 substantially vertical with the horizontal offsets 23 directed forwardly to the legs 30 of the U-shaped members 21a. The bight portions 29 of the U-shaped members 21a act as feet.

What I claim:

1. In a store carrier, a basket fixed thereon, said basket having an open rear end, a baby seat suspended from the respective side and front portions of the basket, said baby seat having supporting structures engaging the bottom of said basket, and further having a member closing the lower portion of the open end of the basket, said member having a substantially vertically disposed means defining openings for accommodation of the legs of a child.

2. A removable seat formed of a wire framework for use in basket carrier in grocery stores, comprising an inverted U-shaped member having the bight portion extending across the back of the seat, each leg of said member including a downwardly projecting portion and a horizontal portion, a cross rod secured to the free ends of the horizontal portions, a second U-shaped member at each side of the seat having a bight portion adapted to rest upon the bottom of the basket, one leg each of the U-shaped members provided with a horizontal portion secured at the free end to the downwardly projecting portion of the legs of the first U-shaped member, the other legs of the second U-shaped members being secured to the cross rod, a hook on each of said other legs engageable on the handle bar of the carrier, a V-shaped sheet of metal attached at one end to the cross bar and lying between the horizontal portions and the downwardly extending portions of legs of the inverted U-shaped member, and means for supporting the other end of the metal sheet adjacent the bight of the inverted U-shaped member.

3. A removable seat constructed of wire strands for use in basket carriers in grocery stores comprising a body formed of an inverted U-shaped member having the outer ends of the legs bent to lie in a horizontal plane, a cross rod secured to the free ends of said legs, a horizontally disposed U-shaped member having the bight portion secured to the legs of the inverted U-shaped member adjacent the bight portion thereof, the free ends of the legs of the second U-shaped member being bent downwardly and welded to the horizontal portions of the legs of the inverted U-shaped member, a pair of supports at each side of the body, each support being in the form of a U-shaped member, the bight portions of which are adapted to rest on the bottom of the basket, the end of each leg of the last mentioned U-shaped member being bent horizontally and welded to an adjacent leg of the inverted U-shaped member, the other leg of said last mentioned U-shaped member being welded to the cross rod, a hook on the free end of each of said other legs engageable over the handle bar of the carrier and a V-shaped metal sheet having one end secured to the cross rod and the other end secured to the bight portion of the second mentioned U-shaped member.

4. A removable seat constructed of wire strands for use in basket carriers in grocery stores comprising a body formed of an inverted U-shaped member having the outer ends of the legs bent to lie in a horizontal plane, a cross rod secured to the free ends of said legs, a U-shaped member at each side of the body and forming supports therefor, the free end of one leg of each member having a bent horizontal portion welded to one adjacent leg of the inverted U-shaped member, the other legs of the second U-shaped member being welded to the cross rod, a hook on the free end of said other leg of the second mentioned U-shaped member and engageable over the handle bar of the basket carrier, the bight portions of the second U-shaped members adapted to rest on the bottom of the basket, and a V-shaped metal sheet having one end secured to the cross rod, and means supporting the other end of the sheet on the legs of the inverted U-shaped member.

5. A removable seat constructed of wire strands for use in basket carriers in grocery stores comprising a body formed of an inverted U-shaped member having the outer ends of the legs bent to lie in a horizontal plane, a cross rod secured to the free ends of said legs, a U-shaped member at each side of the body and forming supports therefor, the free end of one leg of each member having a bent horizontal portion welded to one adjacent leg of the inverted U-shaped member, the other legs of the second U-shaped member being welded to the cross rod, a hook on each free end of said other leg of the second mentioned U-shaped member and engageable over the handle bar of the basket carrier, the bight portions of the second U-shaped members adapted to rest on the bottom of the basket, a V-shaped metal sheet having one end secured to the cross rod, means supporting the other end of the sheet on the legs of the inverted U-shaped member, and means secured to the cross bar to prevent slippage of a child from the seat.

6. A removable seat constructed of wire strands for use in basket carriers in grocery stores comprising a body formed of an inverted U-shaped member having the outer ends of the legs bent to lie in a horizontal plane, a cross rod secured to the free ends of said legs, a U-shaped member at each side of the body and forming supports therefor, the free end of one leg of each member having a bent horizontal portion welded to one adjacent leg of the inverted U-shaped member, the other legs of the second U-shaped member being welded to the cross rod, a hook on each free end of said other leg of the second mentioned U-shaped member and engageable over the handle bar of the basket carrier, the bight portions of the second U-shaped members adapted to rest on the bottom of the basket, a V-shaped metal sheet having one end secured to the cross rod, means supporting the other end of the sheet on the legs of the inverted U-shaped member, and an arm rest at each side of the body and secured to the legs of the inverted U-shaped member.

7. A removable seat constructed of wire strands for use in basket carriers in grocery stores comprising a body formed of an inverted U-shaped member having the outer ends of the legs bent to lie in a horizontal plane, a cross rod secured to the free ends of said legs, a U-shaped member at each side of the body and forming supports therefor, the free end of one leg of each member having a bent horizontal portion welded to one adjacent leg of the inverted U-shaped member, the other legs of the second U-shaped member being welded to the cross rod, a hook on each free end of said other leg of the second mentioned U-shaped member and engageable over the handle bar of the basket carrier, the bight portions of the second U-shaped members adapted to rest on the botom of the basket, a V-shaped metal sheet having one end secured to the cross rod, means supporting the other end of the sheet on the legs of the inverted U-shaped member, the rear end of the basket on the carrier adjacent the seat being open, and a wire frame supported between the second mentioned legs of the second U-shaped member closing said opening.

8. A removable seat constructed of wire strands for use in basket carriers in grocery stores comprising a body formed of a horizontally disposed U-shaped member including a bight portion at the rear of the body, the legs thereof providing arm rests at each side of the body, a vertical U-shaped member secured to the horizontally disposed U-shaped member, the vertical U-shaped member forming the supports for the back of the body and having portions of the legs horizontally disposed below the arm rests, a cross rod welded to the free ends of the legs of the second U-shaped member, a sheet of metal bent intermediate the opposite ends and secured to the cross rod and to the bight portion of the first U-shaped member, wire supporting members on the body and resting on the bottom of the basket, and a hook on the upper end on each supporting member engageable over the handle bar of the basket carrier, the supporting members being welded to the cross rod and to the vertical U-shaped member.

SYLVAN N. GOLDMAN.

REFERENCES CITED

The following references are of record in the file of this patent:

UNITED STATES PATENTS

| Number | Name | Date |
|---|---|---|
| 1,039,759 | Knight | Oct. 1, 1912 |
| 1,192,798 | Scott | July 25, 1916 |
| 1,302,444 | Silverman | Apr. 29, 1919 |
| 1,409,331 | Bestimt | Mar. 14, 1922 |
| 2,276,308 | Hugh | Mar. 17, 1942 |
| 2,446,036 | Zdanaitis | July 27, 1948 |
| 2,479,530 | Watson | Aug. 16, 1949 |

FOREIGN PATENTS

| Number | Country | Date |
|---|---|---|
| 480,939 | Great Britain | Mar. 2, 1938 |